United States Patent

Nussbaum

[11] 3,960,310
[45] June 1, 1976

[54] APPARATUS FOR BRAZING HARDENED TIPS TO SURFACES

[76] Inventor: Lucian Nussbaum, 423 Berrywood Court, West Hempstead, N.Y. 11552

[22] Filed: May 20, 1974

[21] Appl. No.: 471,450

[52] U.S. Cl. ............................. 228/6 R; 76/25 R; 228/8; 228/44.1 R; 228/49; 228/185; 228/212
[51] Int. Cl.² ............................................ B23K 1/04
[58] Field of Search .............. 29/473.1, 493, 502; 228/6, 8, 44, 49, 212, 185, 44.1; 76/25 R, 101 A, 112

[56] References Cited
UNITED STATES PATENTS

| | | | |
|---|---|---|---|
| 2,662,500 | 12/1953 | Fort et al. | 219/85 A |
| 2,673,279 | 3/1954 | Drake | 228/6 |
| 2,714,317 | 8/1955 | Drake | 76/112 |
| 3,295,396 | 1/1967 | Kolb | 76/112 |
| 3,340,378 | 9/1967 | Miller | 219/85 D |
| 3,628,717 | 12/1971 | Lynch et al. | 228/49 |
| 3,718,799 | 2/1973 | Sawamura et al. | 76/112 |
| 3,733,934 | 5/1973 | Stevenson | 76/112 |

*Primary Examiner*—Carl E. Hall
*Attorney, Agent, or Firm*—Bauer, Amer & King

[57] ABSTRACT

The invention relates to an apparatus and method for brazing hardened tips to surfaces as saw blades and the like, wherein the apparatus and method may be performed automatically and in which the hardened tip is held to the surface to which it is joined while a brazing material is melted therebetween and the tip is moved to a final brazed relationship with respect to the surface.

11 Claims, 13 Drawing Figures

APPARATUS FOR BRAZING HARDENED TIPS TO SURFACES

BACKGROUND OF THE INVENTION

The present invention is directed to an apparatus that enables the automatic assembly and securement of a hardened tip of a given composition to a surface of a different composition. More commercially, the invention relates to the joining or brazing, sometimes also referred to as the soldering, of a hardened cutting tip or bit to a steel tooth of a saw blade or the like.

Because of the extreme wear to which saw blades and cutting tools are subjected, the same become dull very quickly and require resurfacing, sharpening and frequent replacement. This is a costly procedure, often requiring much manual labor. It has been found that hardened tips applied and brazed to the surfaces of saw blades is time-consuming, slow, arduous and often imperfectly accomplished.

To the time of the present invention, there has been a need for a rapid, reliable and essentially repetitive method for securing such hardened tips to a variety of types of saw blade teeth with consistency and free of flaws in the brazed joint. There has also been a need for an apparatus that performs such functions automatically, and therefore, inexpensively, eliminating the need for specifically trained mechanics having specialized skills.

Elaborations on the prior art objectives and related subject matter are disclosed in the following related prior art, United States Pat. Nos.:

| | |
|---|---|
| 1,613,957 | 2,823,295 |
| 2,139,499 | 3,099,738 |
| 2,174,801 | 3,335,256 |
| 2,454,190 | 3,337,941 |
| 2,662,550 | 3,340,378 |
| 2,673,279 | 3,740,521 |

SUMMARY OF THE INVENTION

The desideratum of the present invention is to provide an apparatus and a method of joining a hardened tip with a surface to function as the cutting means therefor.

More particularly, an object of the invention is to provide a method and an apparatus functioning automatically for joining the tips and surfaces faster and less costly than has been able to be accomplished before, by reducing the costly labor factor to produce a uniformly finished product of improved characteristics and consistent reliability.

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

DESCRIPTION OF THE DRAWINGS

FIG. 1 is an isometric view of the apparatus constructed according to the invention, FIG. 1 A is an isometric view of a portion of a saw blade with tips joined thereto.

FIGS. 4 A,B and C, illustrate the sequence of feeding assembled sets of brazing shims and hardened tips to the surface of a saw blade, FIG. 6 is an isometric view of the feeder and escapement mechanism, FIGS. 7A, B, and C illustrate the sequence of initially locating and finally positioning the hardened tip relative to the surface to which it is to be joined, and, FIG. 8 is a schematic plan view of the apparatus illustrating the operative details thereof.

Figures 1, 1A:
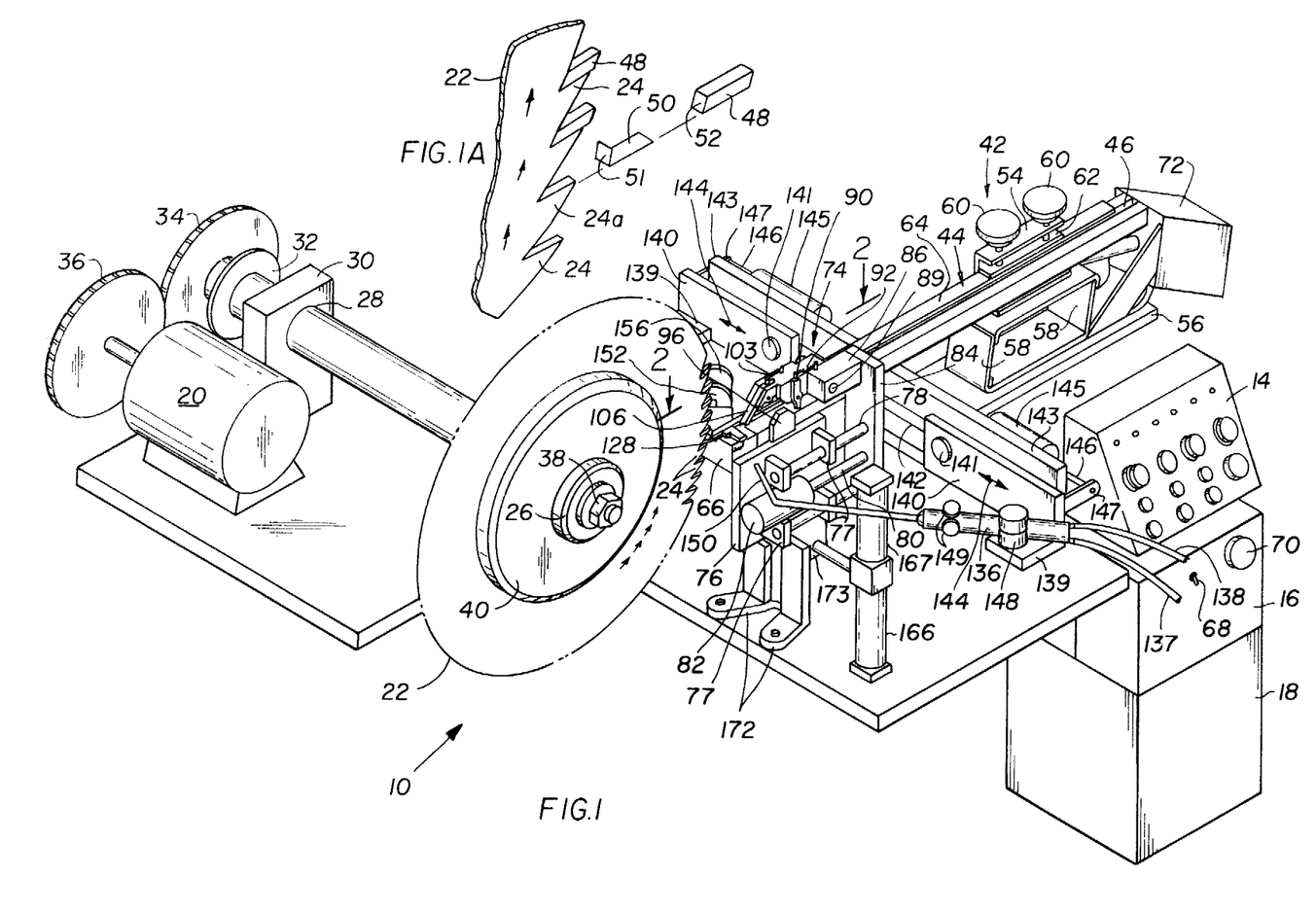

Referring now to the drawings and more particularly to FIG. 1 thereof, the apparatus is generally identified by the numeral 10. It comprises a supporting base 12 to which there is attached a control unit 14. Conveniently positioned beneath the control unit 14 are further control mechanisms such as a vibrator control 16, the use of which will be described at a later time, and a timer control package 18 also to be described subsequently. Mounted on a separate base 12 is a motor drive means 20 for indexing a toothed member such as a circular saw blade 22 having a plurality of teeth 24 thereon.

Although the present invention is conveniently described for use in connection with the brazing of hardened tips to the teeth of a circular saw blade 22, it will be recognized that the invention need not necessarily be limited specifically to the application of such tips to teeth of circular saw blades. It is within the scope of the present disclosure that the hardened tips may be located automatically on any desired surface which will be moved to a brazing position to receive such hardened tip. For convenience, the present disclosure is related to the use of the apparatus 10 in connection with circular saw blades because the greatest and most immediate commercial market is presently found in the need for the application of the hardened tips to the circular saw blade toothed surfaces.

In the present teaching, the saw blade 22 is mounted on an arbor 26 against a reference surface (not shown) which rotates within a supporting sleeve 28 that is supported at its opposite ends in blocks 30 (only one of which is shown). The arbor may be bearingly mounted for smooth and substantially frictionless rotation within the sleeve 28. The arbor 26 is driven by a driven member of a brake 32 interposed between a driven gear 34 of a gear train including a drive gear 36 rotated by the indexing motor 20.

It will be readily understood that the mounting of the saw blade is quickly and conveniently accomplished by an unskilled mechanic who need merely assemble the tightening nut 38 and pad 40 on the front side of the saw blade 22 to clamp the same for indexing rotation with the arbor 26. Thus, for each rotation of the motor 20, the saw blade 22 will be caused to move one of its plurality of teeth 24 toward the brazing position.

Mounted on the base 12 is a structure for moving the hardened tips one at a time to the brazing position at which a respective one of the teeth 24 of the saw is positioned. Such moving structure is generally identified by the numeral 42. The structure 42, also known as a feeding means, comprises an elongated track 44 having a substantially U-shaped channel depression or groove 46 defined therein and extending for the full length thereof for the guided receipt of the hardened tips and for the movement of such hardened tips to the brazing position. In this connection, the present invention teaches an apparatus for moving, by feeding the hardened tips to the brazing position at which the toothed surface has been previously stopped in a manner to be described.

In the present invention, reference will hereafter be made to a composite assembly of a set of hardened tips 48 and brazing shims 50. The tips 48 are substantially conventional and well known and are presently composed of tungsten carbide materials while the shims are of a laminated meltable brazing having a silver base. The composition of the tips and the shims form no specific inventive detail of the present subject matter. Therefore, let it suffice to note that any convenient tip and meltable brazing shim may be utilized in the present apparatus and within the scope of the process taught by the present invention.

In practice it has been found that the shim 50 may be obviated by applying a meltable brazing material between the hardened tip 48 and the surface of the tooth 24 to which the same is to be brazed. However, for convenience, the present inventive disclosure will be described to teach the feeding of the set of the assembled hardened tip 48 and meltable brazing shim 50 as a unit to the surface of the tooth to which the same is to be brazed so that the disclosure will be complete to enable others skilled in the art to practice the present invention. Yet, it is to be understood that the inventive disclosure is not to be so specifically limited. It is within the scope of the present subject matter that the meltable shim 50 need not necessarily be fed to the surface of the tooth 24 in the brazing position simultaneously with the hardened tip 48. Any other meltable brazing material 50 may be utilized and may be supplied to the toothed surface in any other convenient manner and form.

The track 44 is thus supplied with assembled sets of tips 48 and shims 50. These sets may be assembled prior to their insertion in the guide channel 46 of the track. The shim 50 is conveniently provided with a base portion to fit the elongated length of the tip 48 and with an upstanding face 51 to coincide with the leading face 52 of the tip 48. (FIG. 1A). Where the face 52 is sloped or angled with respect to the bottom of the tip, so too, will the face 51 of the shim be coincidingly angled. Hence, the shim conforms to the base surface and the face surface of the tip 48 to fully cover the same when the tip is located on the surface of the tooth 24 to which the same is to be brazed.

The assembled sets of tips 48 and shims 50 are fed along the length of the channel 46. The channel is sufficiently long in length to accommodate a reasonably large number of such sets. Although in practice the channel 46 may not be long enough to accommodate all the sets required to treat all of the teeth 24 provided on the blade 22, it has been found that an attendant may from time to time insert additional sets in the channel to resupply the same or a classic automatic bowl feeder may be utilized.

The track 44 is supported with respect to the base 12 by a track clamp 54 that mounts the same to a supporting plate 56 by way of an intermediate vibritory mounting structure 58 and a vise-like arrangement comprising the adjustable screws 60 and a clamping plate 62. The lateral position of the track 44 may be varied by adjustment of the plate 56 and/or at the clamp 54 to enable the channel 46 to align with the saw blade teeth 24.

The track 44 is formed in at least two parts, namely, a vibrating part 64 and a non-vibrating or fixed part 66. The entrance end of the track 44 is at the right hand portion thereof beyond the clamp 54 whereas the exit end of the track is at the non-vibrating or fixed part 66. The vibration of the part 64 of the track 44 is caused to vibrate in proper frequency and extent by the control mechanism 16 which includes an on-off switch 68 and a manually operable amplitude control knob 70. The controller 16 is connected with a vibrator 72 mounted on the plate 56 and connected with the support 58. The vibrator causes the support 58 to vibrate and transmit its movement to the part 64 of the track.

During the vibration of the part 64 of the track, the sets of tips and shims 48 and 50 are caused to vibrate. Inasmuch as the track is sufficiently deep to retain the sets therewithin and further because the sets cannot vibrate out of the entrance end of the track, they are caused to feed toward the exit end in the direction of the non-vibrating part 66. As the sets move along the track part 64 toward the part 66, they are controlled in their further feeding movement by a combined feeder and escapement mechanism generally identified in FIG. 3 by the numeral 74 and as may be seen in greater detail in FIGS. 4A, 4B, and 4C and also in FIG. 6.

Figure 3:
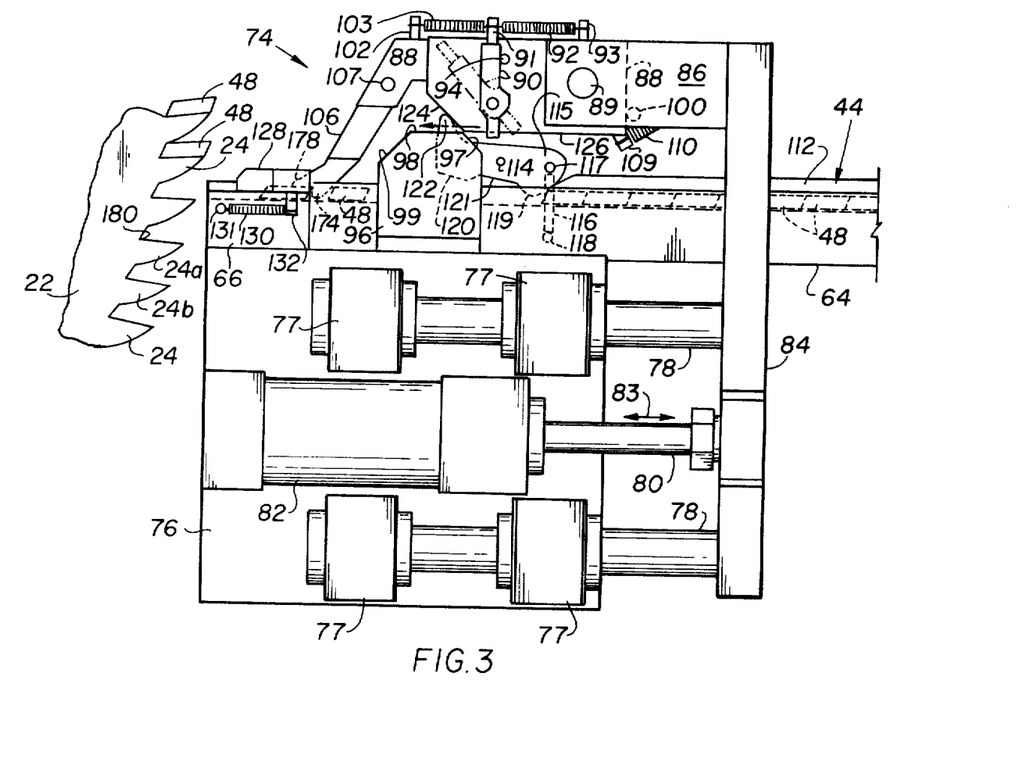
FIG. 3 is a side view FIG. 2 as indicated by arrows 3—3, 6

The feeder and escapement mechanism 74 is supported relative to the track by a substantially vertically disposed mounting plate 76 that conveniently supports a plurality of blocks 77 to extend laterally therefrom. The blocks 77 are supports for positioning guide rods 78 and guiding the same for aligned movement in response to the reciprocating movement of a piston rod 80 forming a part of a fluid operated cylinder 82. Although the present disclosure teaches the use of operative cylinders and discusses their use with respect to fluids as operating media, in the present invention the fluid medium here used may be compressed air or any other convenient gas.

Thus, a supply of fluid (not shown) is furnished to the cylinder 82 to cause the rod 80 thereof to reciprocate in the direction of the arrows 83 as shown in FIG. 3. The rod 80 is connected to an actuating bar 84, that is also connected with the guide rods 78 to assure its planar movement. The bar 84 extends upward and has connected to it a block 86 for simultaneous reciprocation and for similar reciprocation of related parts that are mounted thereto. In this regard, a cam follower plate 88 is pivotally mounted for free rotation to the block 86 as by the bolt 89.

Mounted on the near side of the cam follower plate 88 is a follower element 90 that is spring biased by engagement at its top 91 with a spring 92 that is fixedly mounted at its other end 93 to the block 86 to cause the follower 90 normally to maintain a substantially vertical position stopped in its pivotal movement by a stop pin 94 fixedly mounted in the plate 88. Thus, the follower 90 is permitted to rotate in one direction such as is illustrated by the broken lines in FIGS. 3 and 4A and normally returned to its normal substantially vertical position by the spring 92 as illustrated in solid lines in FIGS. 3 and 4A, 4B and 4C.

Located beneath and forward of the lower end of the follower 90 and in line therewith is a cam lift 96 that is mounted on the side of and adjacent to the exit end of the vibrating part 64 of the track 44. The cam lift 96 has three operative surfaces, namely, a cam rotating surface 97, a flat top surface 98 and a lifting surface 99, all engageable by the lower end of the follower element 90 as the same is caused to reciprocate during the operation of the cylinder 82.

Figure 2:
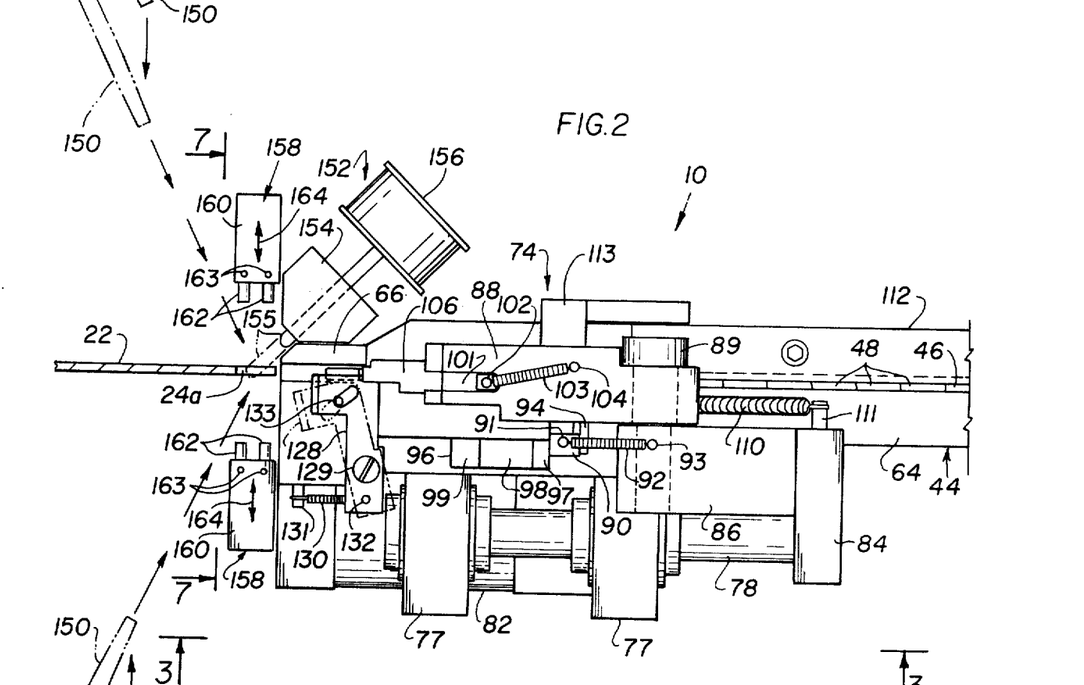
FIG. 2 is a top view of FIG. 1 as indicated by arrows, 2—2.

Mounted on the plate 88 is a tip feeder or moving means and positioner which comprises an elongated slot 101 in the top thereof, as shown in FIG. 2, with a pin 102 projecting upwardly therefrom secured to a horizontal spring 103 that is fixed at its other end to a post 104 on the plate 88. The pin or post 102 is integrally mounted to the top of a tip feeder element 106 that is rotated at 107 such that the post 102 extends upward through the slot 101. The spring 103 constantly biases the tip feeder 106 in a clockwise direction about its pin 107. The rotation of the feeder element 106 is limited by a wall provided at the rear end of the slot 101 (FIG. 2). This arrangement of details may be seen more clearly in FIGS. 4A, 4B and 4C.

The rear underside portion of the plate 88 supports a pin 109 connected to a return spring 110 that is fixedly mounted to the actuating bar 84 at pin 111. The return spring 110 permits the plate 88 to rotate about the bolt 89 and urges the same back to its normal horizontally aligned position stopped by pin 100 after the clockwise torque applied to the same is released. Thus, in FIG. 4C, it will be noted that the plate 88 and structure 100 have the ability to rotate with respect to the block 86 in opposition to the normal urging of the spring 110.

Figure 6:
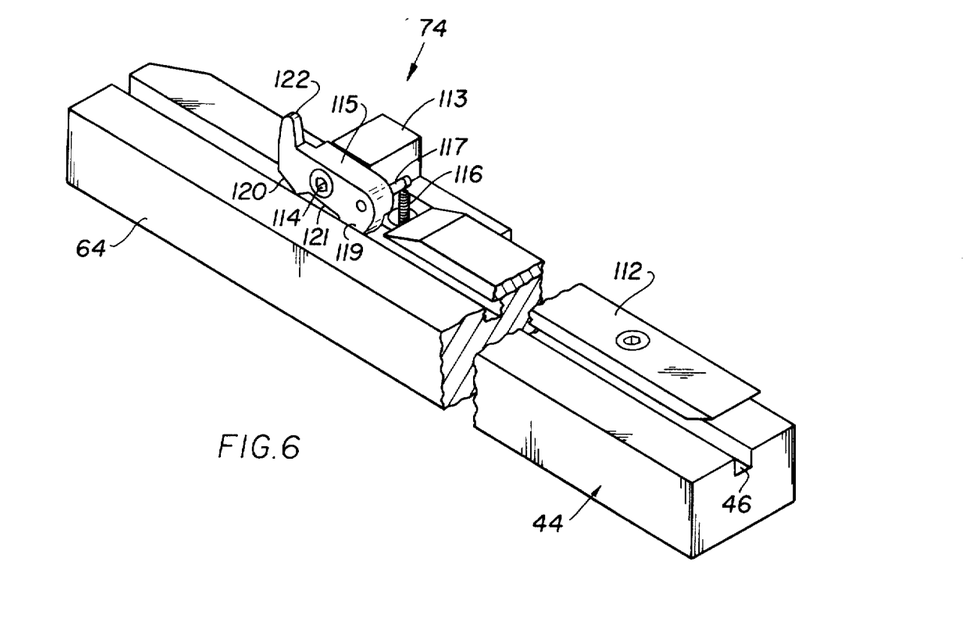

Referring to FIG. 6, it will be noted that a portion of the vibrating portion 64 of the track 44 is illustrated in enlarged detail. A reinforcing plate 112 is bolted to the top of the track for a portion of the length thereof. The reinforcing plate 112 partially covers a lengthwise extent of the channel 46 to limit the possible upward rise and overriding of the sets of tips and shims 48 and 50 and their possible displacement up and out of the channel 46. Beyond the lengthwise extent of the reinforcing plate 112 is a mounting element 113 supporting at 114 for free rotation a feed escapement element 115.

The feed escapement element 115 is constantly urged to a normal horizontal position by an escapement spring 116 mounted on a pin 117 projecting from the far side of the escapement element. The escapement spring extends downward into the confines of the track part 64 and is fixedly secured to a pin 118 as can be seen more clearly in FIGS. 3, 4A, 4B and 4C and 6. The normal urging of the spring 116 causes the escapement element 115 to rotate clockwise about its axis 114. The working portion of the escapement element 115 is located in alignment with the lengthwise extent of the channel 46 so as to obstruct and alternately permit the flow and feeding movement of the sets of tips and shims 48 and 50 therealong. The escapement element 115 has a stop surface or lobe 119 at its lower rear portion thereof that is curved so as to smoothly engage and ride down over a set of tip 48 and shim 50 moving within the channel 46 and thereby engage the same and prevent their further movement along the channel.

The forward underside of the escapement element 115 is provided with a lobe 120 that also functions as a stop or holding means spaced forward of the rear lobe 119. The space between the lobes 120 and 119 is identified by the numeral 121 and is sufficiently long to house a set of hardened tip and shim 48 and 50 during the residence of such set behind the forward lobe 120 in a manner and for a purpose to be described.

The upper forward portion of the escapement element 115 is provided with an upwardly directed projection that may be aptly termed a follower tip 122. The follower tip 122 is positioned in vertical planar alignment with an angularly downwardly directed cam surface 124. The follower tip 122 is rounded at its top to smoothly engage with the surface 124 and cooperate in riding engagement with the same.

The escapement spring 116 retains the tip 122 in engagement with the camming surface 124 during normal operation or in contact with the substantially horizontal underportion or camming surface 126 extending horizontally from the termination of the sloping cam 124. The feeder and escapement mechanism 74 further includes a keeper element 128 that is freely rotatably mounted at 129 to the top of the fixed part 66 of the track 44 as can be seen more clearly in FIGS. 1 and 2. The keeper element 128 is normally biased to a position having its distal portion thereof overlying a short lengthwise extent of the track part 66 as shown by the solid lines in FIG. 2 as a result of the urging of a spring 130 fixedly mounted at its one end 131 to the track 66 and at its other end 132 to the near side of the keeper. The counterclockwise movement of the keeper 128 about its pivot pin 129 in opposition to the normal urging of the spring 130, is guided and limited by a pin 133 mounted in the track part 66 and fitting within an arcuate guiding slot 134 provided in the keeper 128.

Also included in the apparatus 10 are means for melting, by heating the brazing shims 50 or any other meltable brazing material that is utilized to join the hardened tips 48 to the surface of the teeth 24. In this connection, it has been found that gas heat is unusually well adapted for this purpose. For this reason the apparatus is provided with a source of oxygen and an ignitable or combustible gas which may be provided to two laterally opposed heating torches 136 positioned on opposite sides of the track 44 and of the tooth 24 of the saw blade 22 to which the hardened tips are to be brazed. Standard welding torches may be used for this purpose and to provide for a clear understanding of the same, one of the lines 137 may supply the oxygen to the torch while the other line 138 may supply the ignitable fuel or gas.

In FIG. 1 there is an illustration of one of the gas torches 136. A duplicate gas torch is provided on the opposite side of the blade 22 and, therefore, cannot be seen in the present illustration. However, suffice it to say that there are two such torches and these are diagrammatically illustrated in FIG. 2. Each torch 136 is mounted on a support 139 that is formed as a horizontal ear of a plate 140 that has a pin 141 guided in a slide groove or opening 142 formed within a track member 143. Because there are two such torches, the supporting structure for the opposite torch, not shown in FIG. 1, is similarly constructed and guided for lateral movement toward and away from the track 44 in the direction of the arrows 144.

Mounted on the far sides of the track members 143 are torch moving pistons 145 having piston rods 146 engaged with actuating arms 147 that are guided within the guide slots 142 and cause the plate 140 to move in the direction of the arrows 144. The torches 136 may be adjustable by any convenient adjustment mechanism 148 supporting the same on the ears 139. Similarly the infinite control of the oxygen and the ignitable gas may be accomplished at the control valves 149 provided on the body of the torch 136. The nozzle 150 of each torch is sufficiently long to extend from their respective bodies 136 so as to enable the flame to be angled and properly positioned with respect to the tooth, the brazing shim and the hardened tip when the same are assembled in a manner to be described.

At this point it may be helpful to note that the use of gas heat enables an infinite control of the location and focusing of the heat on and about the subsequently assembled hardened tip and its meltable brazing material and with respect to the tooth surface to which the tip is to be brazed. Focusing of the heat of the gas flame is easily accomplished at the adjustment means 148 by moving the torch body 136 both about the vertical axis passing through the adjustment 148 and also adjusting the body of the torch 136 to the right or left of the axis of such adjustment 148. The heat of the flame, it has been found, should be focused such that it is directed primarily at the tooth 24 on which the hardened tip is held. More particularly, the outer envelope of the gas flame should be focused at the tooth and the hardened tip to be brazed thereto such that the hottest point of the heat is directed at the tooth rather than at the hardened tip. Hence, the meltable brazing material is within the outer envelope of the gas flame and neither it nor the hardened tip 48 receives the greatest portion or heat of the gas flame. On the other hand, the tooth of the saw blade 22 having a greater mass and surface area does receive the greater portion of the gas heat and can dissipate the same more readily, not only into the brazing material to melt the same rapidly, but also in the opposite directions to function as a heat dissipator. In this way, it has been found that distortions in the tooth are reduced and practically eliminated and the hardened tip is free of heating distortions after the same cools and is joined to the tooth surface in a manner to be described.

Mounted on the apparatus 10 and alongside the far portion of the stationary part 66 of the track 44 is a blade stop or tooth positioning means generally identified by the numeral 152 as seen in FIGS. 1 and 2, which comprises a fixed block 154 conveniently mounted to the part 66 and carrying an actuatable stop element 155 that is conveniently operated by air cylinder 156. Upon the actuation of the air cylinder 156, the stop element 155 is caused to either project beyond the fixed block 154 within which it is guided for movement or to be withdrawn substantially thereinto free of engagement with the saw blade teeth 24. Thus, it should be apparent that when the air cylinder is actuated in one direction, the stop 155 will be projected into its dash-line position as shown in FIG. 2 to move into the path of a tooth 24 on the saw blade 22 to thereby obstruct the further movement of the tooth beyond the location of the stop. However, when the stop is withdrawn by reverse operation of the air cylinder 156, the saw blade 22 is again permitted to be rotated.

Also provided on the apparatus 10 are a pair of laterally opposed positioning or centering means that may be said to function in the manner of laterally directed clamps generally identified by the numeral 158. The centering means 158 may be seen best in FIG. 2 and their operation illustrated more clearly in FIGS. 7A, 7B and 7C. Each centering means 158 is a mirror-hand duplicate of the other and, therefore, the description of one will suffice for both. The centering means includes a lateral reciprocably movable element 160 that carries with it one or more centering vise projections 162 adjustable in projected position relative to their supporting elements 160 by any convenient adjusting means 163. The centering elements 160 reciprocate in the direction of the arrows 164 in response to the operation of actuating cylinders 166 and 167 mounted in vertical arrangement with respect to each other and supported on the base 12 as can be seen in FIG. 1.

Figure 8:
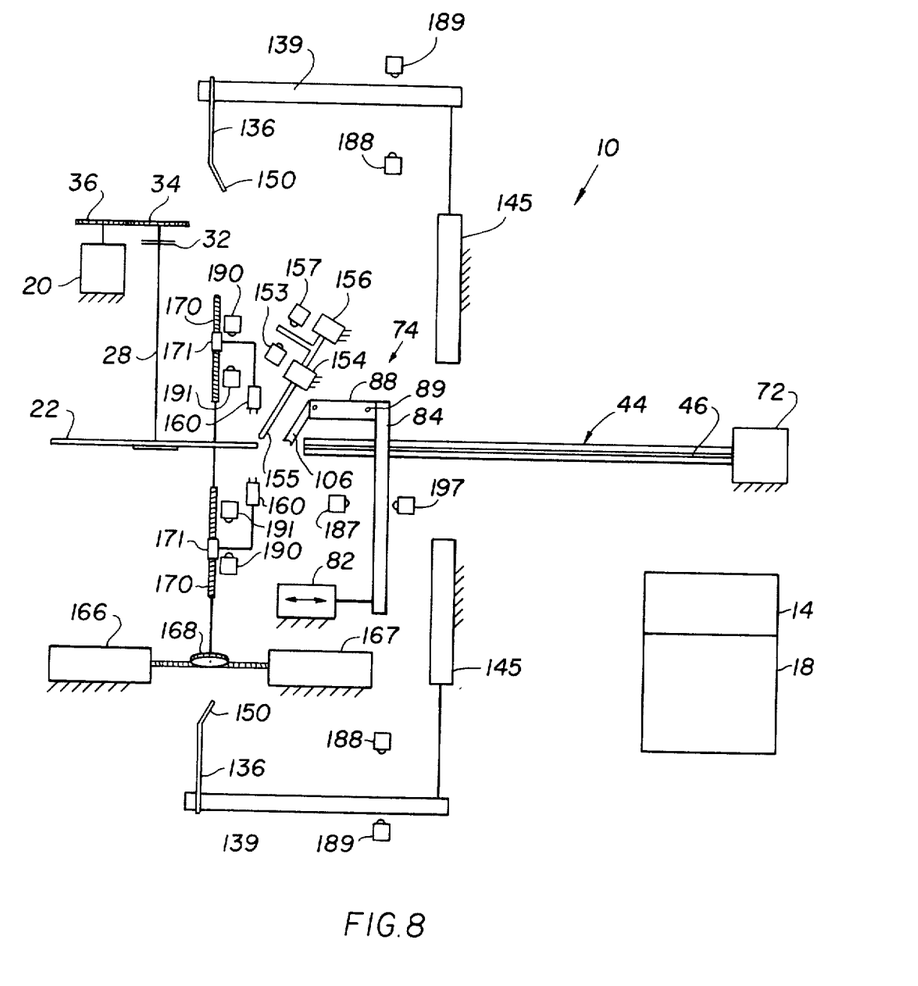

Although the specific operating details of the centering cylinders 166 and 167 may vary, the cylinders presently utilized enable the operation of a piston moving vertically between their respective bodies. The piston carries a rack toothed member (not seen but schematically illustrated in FIG. 8 and identified by the numeral 168.) The rack rotates an elongated screw 170 that supports intermediate its length a follower 171 that mounts the reciprocable element 160 to thereby cause the same to move laterally toward and away from the tooth 24 and the hardened tip 48 positioned thereon and to be brazed thereto. In FIG. 1 vertical posts 172 mounted on the base 12 are utilized to support the housing 173 containing the screw 170 and also the mounting plate 76 supporting the operating fluid cylinder 82 for the feeder and escapement mechanism.

In the operation of the present invention, a toothed member such as the saw blade 22 having a plurality of teeth 24 is mounted on the arbor 26 by placing the pads 40 on the opposite sides thereof and tightening the nut 38 thereagainst. The channel 46 of the vibrating part 64 of the track 44 is filled with hardened tips 48 at the right-hand entrance end thereof. In those instances when sets of assembled tips 48 and meltable brazing shims 50 are utilized, the sets will be fluxed, pre-assembled and dried before they are inserted and fed into the channel 46.

It is to be noted that the brazing operation is enhanced by the application of a brazing flux which may be initially applied about the outer periphery of the saw blade 22 to completely cover all of the surfaces of the teeth 24. Where no brazing shim 50 is utilized, a meltable brazing material may be applied to each tooth 24 before or after the hardened tip 48 is fed thereto and positioned on the surface of the tooth. Let it suffice, however, for the purpose of description of the present invention to consider the possibility that assembled sets of shims 50 and hardened tips 48 are utilized.

Figure 4A:
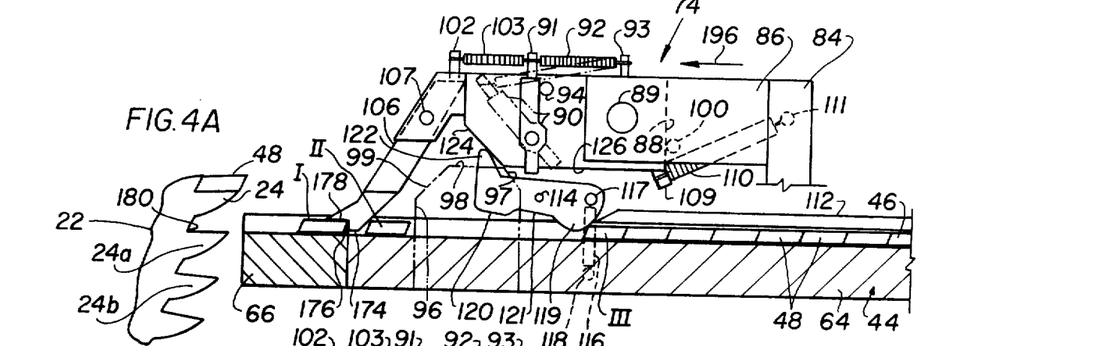

After the track 44 is supplied with a sufficient number of such assembled sets, the apparatus 10 is then initiated for operation. The control unit 14 is provided with a plurality of selector buttons and dials along with indicator lights to enable an unskilled operator to utilize the apparatus in a selective manner to permit the same to operate automatically to supply the sets seriatim to a respective tooth or to any selected tooth 24 about the periphery of the member 22 having a variety in the shape, size and number of teeth. Electrical power to the apparatus is initiated by the operation of an appropriate switch on the panel 14. Thereafter, the further operation of the vibrator switch 68 will initiate the feeding function of the track 44 to cause the vibration of the sets of hardened tips and shims to move to the left along the track channel 46 toward the escapement element 115 where the first one in the train of sets will be stopped by the rear lobe 119 of such element much in the manner as is seen in FIGS. 3 and 4A.

Assuming that this is the first or initial operation of the apparatus 10, the first set denominated by the Roman Numeral I would be stopped by the lobe 119 and prevented from moving therebeyond along the track 44. Thereafter, the actuation of an appropriate button on the panel 14 will initiate the remaining automatic sequential operation of the various structural parts of the apparatus 10. This causes the initial operation of the stepping or indexing motor 20 to rotate the same for a pre-set degree of rotation resulting in the rotation of the gear train 36 and 34 and the consequent rotation of the member 22 by way of the brake 32.

Upon the initial operation of the motor, the cylinder 156 of the blade stop or tooth positioning means 152 is operated to project the stop element 155 into the path of the upcoming tooth 24. As noted in FIG. 5, the stop element 155 may be flattened at its bottom surface to be aligned with the level of the base of the track channel 46 to thereby provide an abutment for the upper surface of the upwardly moving tooth 24 and thus delineating the brazing location of the tooth. As the tooth 24 moves upwardly in a counter-clockwise direction, it abuts the undersurface of the element 155 and thus its further upward rotation is halted. Motor 20 could be stalled and its shaft braked in the stalled position, but the accurate positioning of the disc 22 on arbor 26 is ensured by the brake 32 in spite of possible backlash in the gear train 34-36.

The periodic operation of the motor 20 is controlled by a timer (not shown) within the timer control package 18. The periodic timed operation of the motor 20 is longer than is required to move the next lowermost tooth 24 into the brazing position which is identified or delineated by the flat undersurface of the stop element 155. Thus, even though energization of the motor may continue for its full term of operation, the surface of the tooth 24, halted in its rotation by the element 155, will not affect the motor. However, the motor will terminate its operation automatically by the opening of the appropriate switch contacts on the timer within the control package 18.

At this point the upper surface of the tooth 24 is now in the brazing location and is now identified as 24a. Because the further operation of the motor has ceased, the stop element 155 may now be retracted. Accordingly, contained within the control package 18 is a switching mechanism of conventional design which permits the de-energizing of the cylinder 156 in response to the termination of the operation of the motor 20 to withdraw the stop element 155 to its inactive solid line position as shown in FIG. 2. The start of the motor 20 signals the timer control package 18 to go on with its automatic functions.

Figure 5:
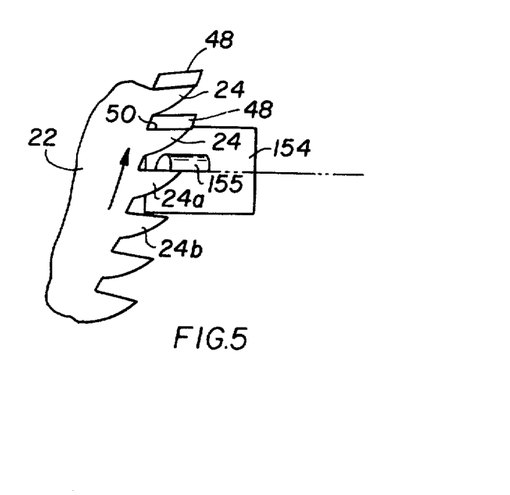
FIG. 5 is a side view of a tooth stopped in its brazing location to receive an assembled set of the shim and hardened tip.

The initial operation of the stop element 155 toward its active stopping or dash-line position as shown in FIG. 2 and as illustrated in FIG. 5 causes the engagement of a switch contact 153 (FIG. 8) that signals the control package 18 that the stop is in position, thereby signalling the timer circuit of the motor 20 that it is able to stop its rotation. However, upon the completion of the rotation of the indexing motor 20, the stop element 155 is withdrawn as previously described and a further switch contact 157 (FIG. 8.) is engaged to signal the removal of the stop element from engagement with the tooth 24a in the brazing location and now signals the timer control package 18 to continue its automatic functions.

All during this time the sets of hardened tips 48 and shims 50 are being vibrated to cause them to move forward along the track 44. Those skilled in the art will readily recognize that if the apparatus 10 is being used for the very first time, it will be necessary to operate the apparatus at least two cycles before the first set of hardened tip and shim 48 and 50 can be moved to the ultimate feeding position as identified by the Roman Numeral I in FIG. 4A. For convenience, let us assume that the apparatus has operated the requisite two cycles to position the set I in its location as shown in FIG. 4A. The sequential operation thereafter follows automatically.

The termination of the timed operation of the motor 20 automatically triggers an electrical circuit which actuates the cylinder 156 to withdraw the stop element 155 which upon actuation of its return switch 157, signals the package 18 to enable the operation of a valve (not shown) which controls the flow of fluid into the cylinder 82 to cause the piston 80 to withdraw into the cylinder toward the left thereby moving the bar 84 and the related feeder structure 74 with it. As the bar 84 moves toward the left, the tip feeder 106 engages on top of and behind the set I of the hardened tip and shim as shown in FIG. 4A.

At this point it will be noted that the lower end of the tip feeder 106 is provided with a heel 174 at the bottom of a substantially vertically disposed wall 176 that forms a corner seat with a substantially horizontally disposed wall 178. The seat formed by the walls 176 and 178 provides an engaging arrangement to assure the forward yet guided movement of the set I from the fixed part 66 of the track toward and onto the aligned surface of the tooth 24a shown in FIG. 4A. The horizontal surface 178 covers the tip 48 while the surface 176 functions as a pusher surface. As a consequence, the guided movement of the set toward the tooth surface 24a is assured and is positive in movement. Further, the surface 178 prevents any possible upward tilting of the set I and, therefore, prevents any possible misalignment of the same with the surface 24a of the tooth in the brazing position.

Figure 4B:
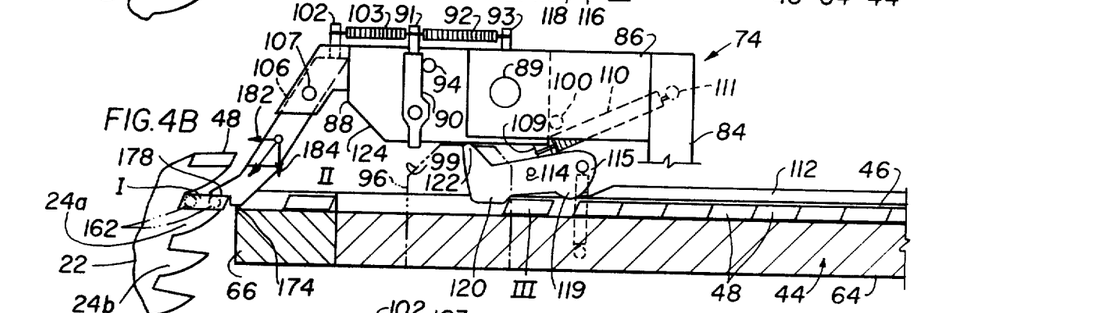

The forward movement of the bar 84 and the tip feeder 106 continues until such time as the set I is transferred from the fixed part 66 of the track 44 to the surface 24a of the tooth aligned therewith. It thereafter continues its feeding motion in the direction of the tooth 24a to assure that the set I will abut into the corner 180 of the tooth as is shown in FIG. 4B. This is accomplished by continued movement of the bar 84 to the left toward the tooth. During this continued movement, the lower corner of the shim 50 of the set I will abut the corner 180 of the tooth. However, this is not sufficient. As the bar 84 continues its leftward feeding movement, the continued leftward movement of the tip feeder 106 is halted by the seating of the set I against the corner 180. Because the feeder 106 is halted the same pivots in a counter-clockwise direction about its pin 107 relative to the plate 88 in opposition to the normal urging of the horizontal spring 103 which then expands and permits the mounting pin 102 to move forward toward the left within the slot 101.

Thus, even though the leftward movement of the tip feeder 106 is stopped by the abutment of the set I with the corner 180 of the tooth surface, the bar 84 continues to move leftward in its feeding direction. As a consequence, there are two components of forces that are now applied to the feeder tip 106 by the feeder mechanism. One of the components is in the horizontal direction and is identified by the arrow 182 in FIG. 4B; the other component is in a downward or vertical direction indicated by the arrow 184. A resulting component of force is indicated by the arrow 186. These components of forces are applied to the set I to retain the same seated tightly downward against the upper surface of the tooth 24a and also snugly within the corner 180 of the seat of such tooth surface.

The forward force applied by the bar 84 in response to the operation of cylinder 82 remains until released in a manner to be described. The forward movement of the bar 84 triggers a switch 187 which now signals the initiation of the operation of the heating means 136 at the control package 18. In automatic response to such initiation, the heating means 136 are now actuated laterally inward toward the tooth surface 24a by the operation of the cylinders 145. As noted previously, the lateral inward movement of the torches is guided at 141, 142 and 147 relative to the track member 143 until such time as a member of such guiding structure abuts and actuates a time control switch 188.

Although in the actual operation of the present apparatus 10 the flame produced by the torch 136 is always operating, it has been found that the operation of the torch or heating means can be initiated during the lateral inward movement of the torches toward the saw blade tooth 24a and terminated upon their return lateral outward movement away from the saw blade tooth after the melting of the brazing material 50 has been accomplished. The necessity of initiating the operation and terminating the operation of the torch saves very little fuel and, therefore, in actual operation of the apparatus 10, the torches remain functioning throughout the use of the apparatus.

As the torches 136 are moved laterally inward toward the surface of the tooth 24a on which the set 1 is now being forcefully held and clamped by the seat structure at the lower end of the tip feeder 106, the heat of the gas flame is focussed below the corner 180 in the manner previously described. The time period during which the tooth 24a and the set 1 are subjected to the heat of the gas flame is controlled by a pre-set timer contained within the control package 18. Therefore, after a sufficient period of operation, the heating means 136 are retracted and withdrawn and, therefore their heat is removed from application to the tooth and set 1.

During the period of heating application, the tooth 24a and the tip 48 reach the brazing temperature, the brazing shim 50 is caused to melt and as the heaters 136 are withdrawn away from their heating position, they engage return signal switches 189 which signal the package 18 that the heating operation is completed and that the brazing material is melted. This automatically initiates the operation of the centering means 158 which are positioned on opposite sides of the hardened tip 48 of the set 1 in the brazing position.

Figure 7A:
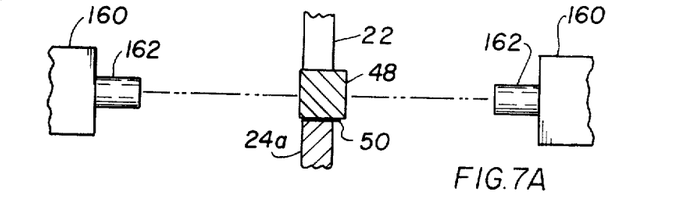
Figure 7B:
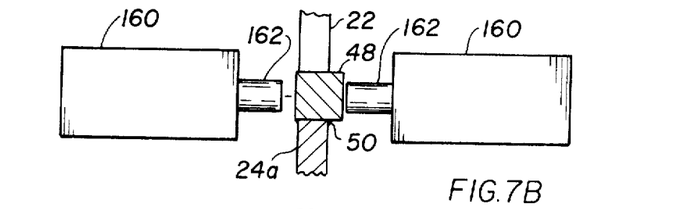
Figure 7C:
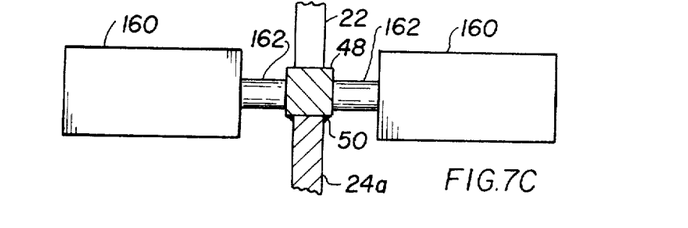

Automatically, the cylinders 166 and 167 are initiated and thus substantially simultaneously with the removal of the heat, the centering means are caused to move laterally inward to engage opposite lateral faces of the hardened tip 48 of the set 1. The sequential operation of the centering means is illustrated in FIG. 7A, 7B and 7C wherein as the reciprocable elements 160 move inward toward the set 1, their vise projections 162 engage opposite lateral facing sides of the hardened tip 48. In FIG. 7B it will be noted that initially, the hardened tip and its brazing shim 48 and 50 are fed to the tooth surface offset with respect to the center of the blade member 22. This is done purposefully.

During the fully molten state of the brazing material 50, the centering vise closes with both sides moving symmmetrically relative to the center of the blade 22. It has been found that the molten braze material 50 tends to release gas bubbles. These gas bubbles deleteriously affect the resultant joint or braze between the hardened tip and the tooth 24. Hence, it is necessary to break such bubbles and cause the release of the gas. Otherwise, the trapped gas will result in an imperfect joint.

By moving the centering means 158 symmetrically on opposite sides of the blade 22, one of the projections 162, namely, the right hand set of projections, engage the hardened tip 48 before the other set of projections and thereby cause the hardened tip to move to the left. The leftward movement of the hardened tip is limited and stopped by the engagement of the left side projections 162 therewith as shown in FIG. 7C. As a consequence, the hardened tip 48 is centered with respect to the saw blade 22 and also with respect to the tooth 24a thereof. At the same time, the shifting movement of the hardened tip has caused the breaking and release of whatever gas bubbles may have formed between the tip and the tooth surface.

It will be recognized that because the tip 48 of the set 1 is still being held and clamped forward and downward by the tip feeder 106, the centering vise-like movement of the means 158 causes the hardened tip to move relative to the seat 176, 178 of the tip feeder and thus, the hardened tip is now clamped in its final centered position by both the centering means 158 as shown in FIG. 7C and by the tip feeder 106 as seen in FIG. 4B.

The operation of the centering means and the tip feeder are time controlled. That is to say, knowing the specific brazing material 50 being used and the time it requires to join the hardened tip 48 to the surface of the saw blade tooth 24a, it is now possible to control the period of operation of the tip feeder 106 and the centering means 158. It is also recognized that the engagement of the tip 106 feeder and centering means 158 with the hardened tip 48 produces a more rapid heat exchange and dissipation of heat from the tip which results in a more rapid hardening and joining of the hardened tip to the tooth surface.

After the appropriate time has elapsed, a circuit will be initiated within the control package 18 to withdraw the bar 84 from its feeding position as shown in FIG. 4B and the centering means 158 from its clamping position as shown in FIG. 7C. As the centering means fully withdraw to their inactive laterally opposed positions, they engage and operate time control switches 190 whereas their inward time control switches 191 had initially set the timer in the control package 18 into timing operation. The return of the centering means 158 and feeding means 74 now signals the control package 18.

Figure 4C:
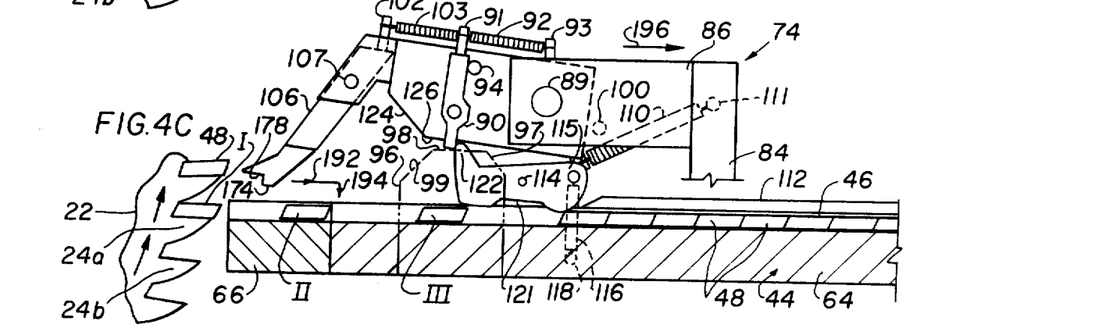

During the return of the feeder mechanism 74, the flow of fluid in the cylinder 82 is reversed and the rod 80 is caused to move outward from the cylinder to the right as seen in FIG. 3. During the return movement, the follower element 90 is maintained in its substantially upright, solid-line position by the spring 92. Its lower end is shown in FIG. 4B positioned to the left of the lifting surface 99 on the cam lift member. Continued rightward movement of the bar 84 causes the lower end of the element 90 to engage and ride upward along the surface 99 and then across the top surface 98 because of the presence of stop 94. This return movement is depicted in FIG. 4C wherein the lower end of the follower 90 is now engaged with and is riding to the right along the top surface 98.

Because the follower element 90 was lifted by riding upward along the lifting surface 99, the cam follower plate 88 was similarly caused to lift and rotate about its bolt 89. As a consequence, the lifting rotating movement of the plate 88 carries with it the tip feeder element 106. Viewing FIG. 4C, it will be recognized that the lifting movement generated by the surfaces 99 and thereafter 98 causes the lower heel 174 of the tip follower 106 to rise during its return rearward movement in the direction of the arrows 192 as seen in FIG. 4C.

The continued rightward or return movement of the bar 84 now returns the follower 90 to the position beyond the top surface 98 and as this happens, the follower 90 rides down the pivoting surface 97 and to the right therebeyond. This continued return movement now enables the plate 88 and the attached feeder 106 to drop once again in the direction of the arrow 194 as depicted in FIG. 4C under the influence and urging of the spring 110 connected to the underside of the plate 88. Thus, the follower tip 106 and the plate 88 assume the initial aligned position as shown in FIG. 4A ready for a new feeding movement.

If it be assumed that the parts of the feeder and escapement mechanism are in the relationship as illustrated in FIG. 4A before the set I can be moved to its present position as shown, it must start at the position shown by set III wherein it is stopped in its feeding movement by the lobe 119 of the escapement element 115. In order to enable the first tip to move beyond the lobe 119, it is necessary to rotate the escapement element. This is accomplished when the bar 84 moves toward the left or feeding direction. There it will be noted that the tip 122 of the element 115 is in engagement with the sloping cam surface 124.

Hence, as the structure 74 moves in its feeding direction as shown by the arrow 196 in FIG. 4A, the tip 122 rides downward along the surface 124 rotating the escapement element in opposition to the spring 116 and, thereby, lifting the lobe 119 to enable the set to move from the position III toward engagement with the facing surface of the lobe 120 at the opposite feeding end of the element 115 as shown in FIG. 4B. This position is identified by the Roman Numeral III in FIG. 4B. In the same time the tip identified II in FIG. 4A advanced in FIG. 4B on the track 66. Thereafter, during the return movement of the bar 84 from its feeding position, the undersurface 126 releases the follower tip 122 as seen in FIG. 4B. Thereafter the tip 122 rides upwardly under the influence of the spring 116.

This upward movement of the feeding end of the escapement 115 raises the lobe 120 from obstructing the forward feeding movement of the set III enabling it to move beyond the lobe 120 along the path as shown by the Numeral III in FIG. 4C. When the set moves beyond the lobe 120, it is still under the influence of the vibration of the track part 64 and, therefore, requires a period of movement before it reaches the stationary or fixed track part 66. When it reaches the track part 66, it will thereafter be in a position such as identified by the Roman Numeral II in FIG. 4C. Since the part 66 is fixed against movement, the set II stops at its position as shown in FIG. 4C. The returning feeding movement of the bar 84 and the tip feeder 106 over and behind the set in the stop position II now enables the tip follower and its seat formed by the surfaces of the walls 176 and 178 to engage behind the tip in the manner as shown in FIG. 4A wherein the tip is now identified as I and the tip III is now identified as II.

Thus, the feeder and escapement mechanism 74 has four distinct movements. At the outset, the line of feeding hardened tips or sets is stopped by the lobe 119. Thereafter, one tip or set is permitted to move into the confines of the escapement element 115 between the lobes 119 and 120. Then tip III of FIG. 4B, the set or tip is permitted to move beyond the lobe 120 toward the feeding position as is illustrated in II IN FIG. 4A. For the second cycle, another set or hardened tip is automatically supplied and fed to a position II (FIG. 4A) behind the heel 174 of the feeder element and the previous numeral II is thus ready to assume the feeding position I immediately after the tip feeder 106 has moved the previous set or tip I onto the surface of the tooth 24a previously stopped in the brazing location.

The automatic cycling of the apparatus 10 is accomplished without further attention of a mechanic or skilled individual. Each forward and return movement of the actuating bar 84 causes the consequential actuation of a switch 187 or 197 to signal the apparatus either to stop in its next operation or to continue its next operation. Thus, by the proper controls disclosed, the automatic operation of the apparatus 10 is foolproof. The sequential movements of each of the described structures may be initiated or stopped separately at the control package 18 as also controlled in response to the various switches and buttons on the control panel or unit 14. Unless the attendant finds some reason to terminate the operation of the apparatus 10, the same will perform its operations in its programmed sequence as aforedescribed.

As noted previously, although the operation of the apparatus 10 has been described with respect to sets of hardened tips 48 and brazing shims of meltable brazing material 50, it is within the invention that the shims may be eliminated. In such case, the teeth 24 of the blade 22 are coated with a paste, the meltable brazing material 50 is applied to the surface of each tooth 24, or the meltable brazing material is inserted on the surface of each tooth 24 after the feeding of a hardened tip 48 and after the tooth 24 and the tip 48 have reached the brazing temperature or the brazing material is previously attached to the tip.

It is to be noted that when the hardened tip 48 is moved to and positioned on the surface of the tooth 24a in the brazing location, such hardened tip is clamped by the tip follower 106 in such location from the time it is moved onto the surface of the tooth until such time as the joint between the hardened tip and the tooth is made. Thus, even during the centering operating as performed by the centering vise means 158, the hardened tip will be under the influence of the forward and downward components of force exerted there against by the tip follower 106.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

I claim:

1. In an apparatus for brazing a hardened tip to a tooth of a toothed member having meltable brazing material therebetween, the invention comprising means movably mounting said toothed member to present a tooth thereof to a brazing position, means for feeding and applying a force to the tip to hold the same to the tooth in the brazing position to be brazed thereto, heating means for applying heat to the toothed member and to the held tip to melt the brazing material therebetween, means for moving the tip relative to said force applying means and to the tooth and for holding the tip in brazing position on the tooth until the braze is completed, said means being operable in a selected sequence, and means on said apparatus connected with each of said means for automatically controlling their sequence of operation.

2. In an apparatus as in claim 1, and means for stopping the movement of the toothed member to locate the tooth in its brazing position prior to the feeding of the tip to the tooth.

3. In an apparatus for automatically brazing a hardened tip to a respective tooth of a movable member having a plurality of teeth with a meltable brazing material therebetween, the invention comprising moving means connected with and for moving the toothed member to present a selected tooth thereof to a brazing position, stop means engaging the toothed member to stop the selected tooth at the brazing position, means for supporting a plurality of the hardened tips and including means for positively feeding and forcefully holding a tip to a selected tooth at the brazing position, means for applying heat to melt the brazing material, means for engaging at least a portion of the forcefully held tip to move the same relative to said holding means and to the selected tooth, and means connected with certain of said means to automatically control their operations.

4. In an apparatus as in claim 3, said supporting means including a track in which the tips are guided for movement toward the brazing position, means moving said track to cause the tips to move there along toward the brazing position, and said feeding means including pusher means cooperating with said track to positively engage and to move each tip onto a respective tooth stopped in the brazing position.

5. In an apparatus as in claim 4, escapement means cooperable with said track and with said pusher means to control the feed of the tips along said track toward the brazing position.

6. In an apparatus for brazing a set of a hardened tip and a meltable shim to the tooth of a movable member having a plurality of teeth, the invention comprising means for moving the toothed member and to locate a selected tooth thereof in a brazing position, means for positively moving and positioning the set on the selected tooth in an initial brazing position, a source of gas flame heat, means for focusing the heat primarily at the tooth in the brazing position in the proximity of the set retained thereon to melt the shim of the set and for removing the heat from the tooth after the shim is melted, and means for moving at least the tip of the set from said initial position relative to the tooth after the shim is melted to a second position relative to the tooth, said positioning means applying a force to the tip to retain the same in its initial position and in its second position on the tooth.

7. In an apparatus as in claim 6, control means connected with said means and source of heat to control the sequential operations thereof automatically.

8. In an apparatus as in claim 7, said control means including means connected with said moving means to cause the movement thereof after the shim is melted.

9. In an apparatus as in claim 6, said means for moving the toothed member including a rotatable support for the toothed member, a rotatable motor to rotate said support and toothed member, and brake means between said motor and the toothed member to maintain the position of said toothed member after the selected tooth is located in its brazing position.

10. In an apparatus as in claim 7, said control means including means connected with said positioning means to cause the same to release the force on the set after at least the tip thereof has been moved to said second position and joined to the selected tooth.

11. In an apparatus as in claim 6, and means connected with said toothed member moving and locating means, said positioning means, said heat focusing means and said tip moving means for controlling their operations automatically.

* * * * *